United States Patent [19]
Zegeer

[11] Patent Number: 5,702,791
[45] Date of Patent: Dec. 30, 1997

[54] FURNITURE PROTECTOR DEVICE

[76] Inventor: Jim Zegeer, 1211 Lyndale Dr., Alexandria, Va. 22308

[21] Appl. No.: 602,765

[22] Filed: Oct. 24, 1990

[51] Int. Cl.⁶ .......................... B65D 65/02; B65D 85/00; B32B 3/00
[52] U.S. Cl. .................. 428/53; 428/54; 428/58; 428/68; 150/158; 206/326
[58] Field of Search .............. 206/326; 150/158; 428/53, 54, 58, 68

[56] References Cited

U.S. PATENT DOCUMENTS

| | | | |
|---|---|---|---|
| 1,123,383 | 1/1915 | Rodenhausen | 428/81 |
| 3,266,545 | 8/1966 | Kruissink | 150/158 |
| 4,032,063 | 6/1977 | Davis et al. | 206/326 |
| 4,985,952 | 1/1991 | Edelsow | 150/158 |
| 5,070,664 | 12/1991 | Groh et al. | 428/334 |

OTHER PUBLICATIONS

Webster's Ninth New Collegiate Dictionary; p. 1081; "Sham 3:"; Merriam-Webster Inc; 1990.

*Primary Examiner*—Terrel Morris

[57] ABSTRACT

A furniture protector for protecting the fabric of upholstered furniture such as sofas and easy arm chairs and the like, from damage by pet dogs includes one or more rigid panels having a width to span a predetermined portion of the front to back seating space and a length to span the seating spaces. The rigid panels leave no comfortable space for pet dogs to rest. The panels have decorative surfaces and fabrics which can be color coordinated with the fabric of the upholstered furniture. Handles are provided and various arrangements for compacting the panels for storage are disclosed.

17 Claims, 3 Drawing Sheets

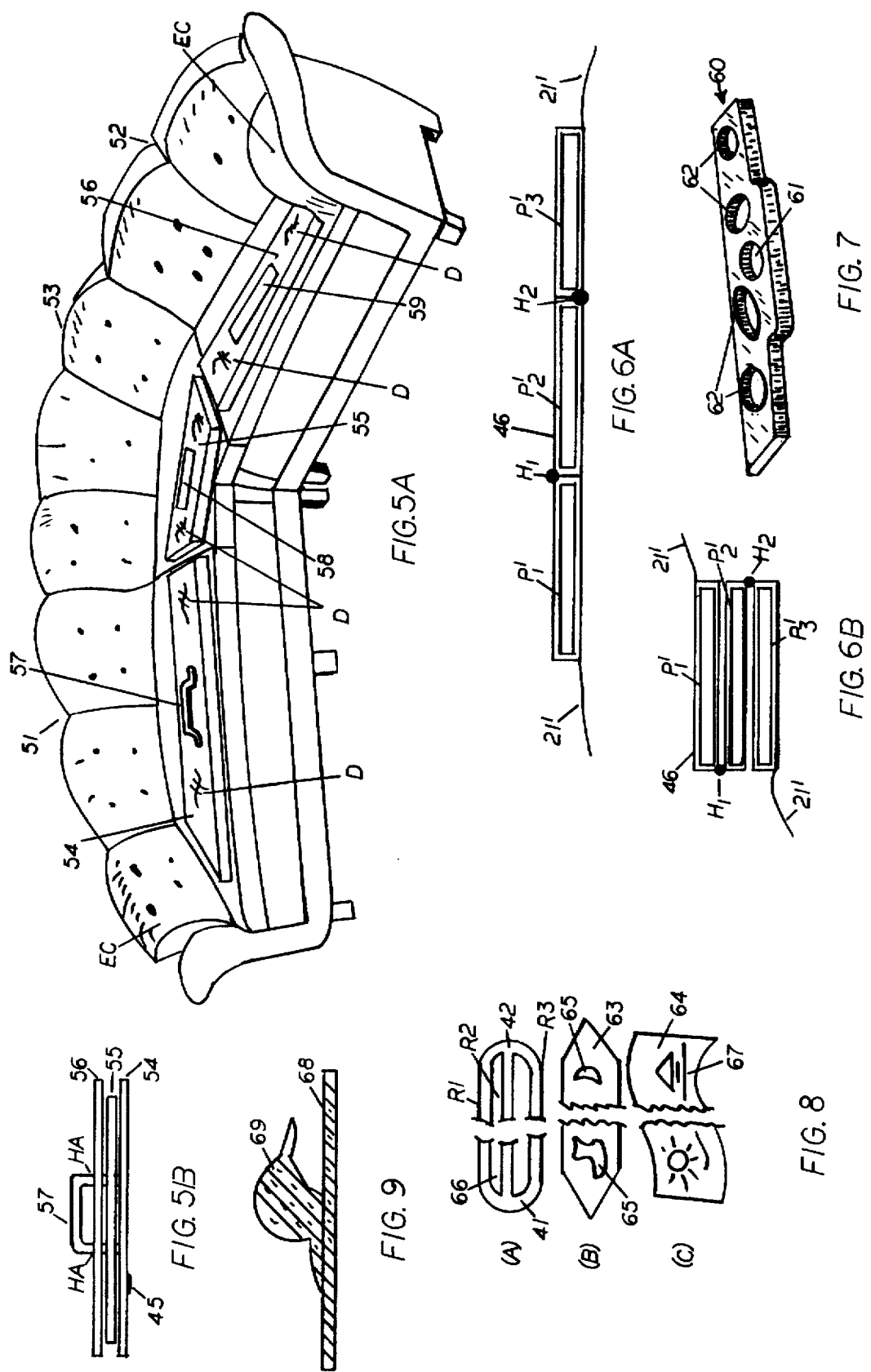

FURNITURE PROTECTOR DEVICE

BACKGROUND AND BRIEF DESCRIPTION OF THE INVENTION

The present invention relates to furniture protection devices for protecting upholstered furniture such as easy chairs, sofas and sectional sofas from damage by dogs.

Many people have dogs which have not been trained to stay off their upholstered furniture and the dogs do extensive damage to the furniture leading to the need to either cover the furniture with protective coverings, thereby hiding the true beauty of such furniture leading to less than full enjoyment thereof, reupholster or replace the furniture. Even though such furniture has been extensively damaged by the animal, such people are reluctant to purchase new furniture or may delay replacement until the pet has either died or been removed from the premises.

The object of the present invention is to provide a furniture protector that keeps the pet animal off of the furniture, is decorative and adds further design parameters to furniture designers and manufacturers, is low in cost, easily stored and very easy to use and can enhance the sale of new upholstered furniture or enhance the reupholstering or recovering of pet dog damaged furniture. According to the invention, the seating space is made uncomfortable for the pet and, at the same time, the appearance of the furniture is enhanced by various designs carried by the protector or color coordination of fabrics.

DESCRIPTION OF THE DRAWINGS

The above and other objects, advantages and features of the invention will become more apparent when considered with the following specification and accompanying drawings wherein:

FIG. 5a shows a further embodiment of the invention as it is applied to a sectional or curved sofa, FIG. 5b is a side elevational view of the protector panels shown in FIG. 5a stacked for storage, FIG. 6a is a side elevational view of a further embodiment of the invention and FIG. 6b is a side elevational view showing the protector of FIG. 6a folded for storage, FIG. 7 is a perspective view of a further embodiment of the protector of this invention, FIG. 8a is a top plan view of a further embodiment of the invention, FIG. 8b is a top plan view of another embodiment of the invention, and FIG. 8c is an illustration of another embodiment of the invention, and FIG. 9 is a sectional view of an embodiment of the invention in which surface of the protector panel is decorated with a three-dimensional artistic design.

DETAILED DESCRIPTION OF THE INVENTION

Figure 1:
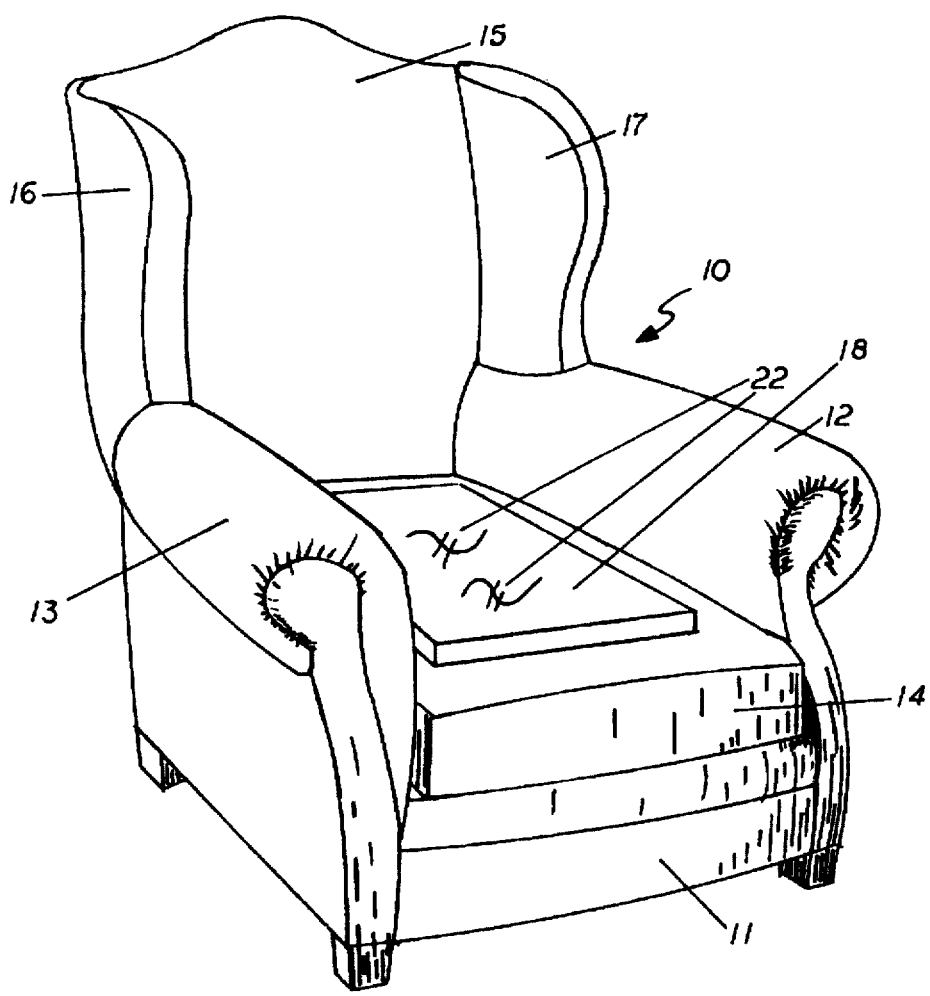
FIG. 1 is an isometric view of an arm chair incorporating the invention.
Figure 2:
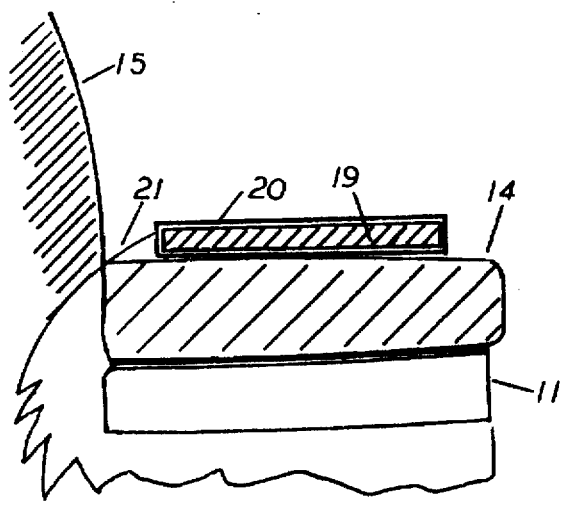
FIG. 2 is a partial sectional view of the rear seat back portion of the chair of FIG. 1, showing how the tuck flap retainer is tucked between the bight between the lower edge of the back rest and the rear edge of the seat cushion.
Figure 3:
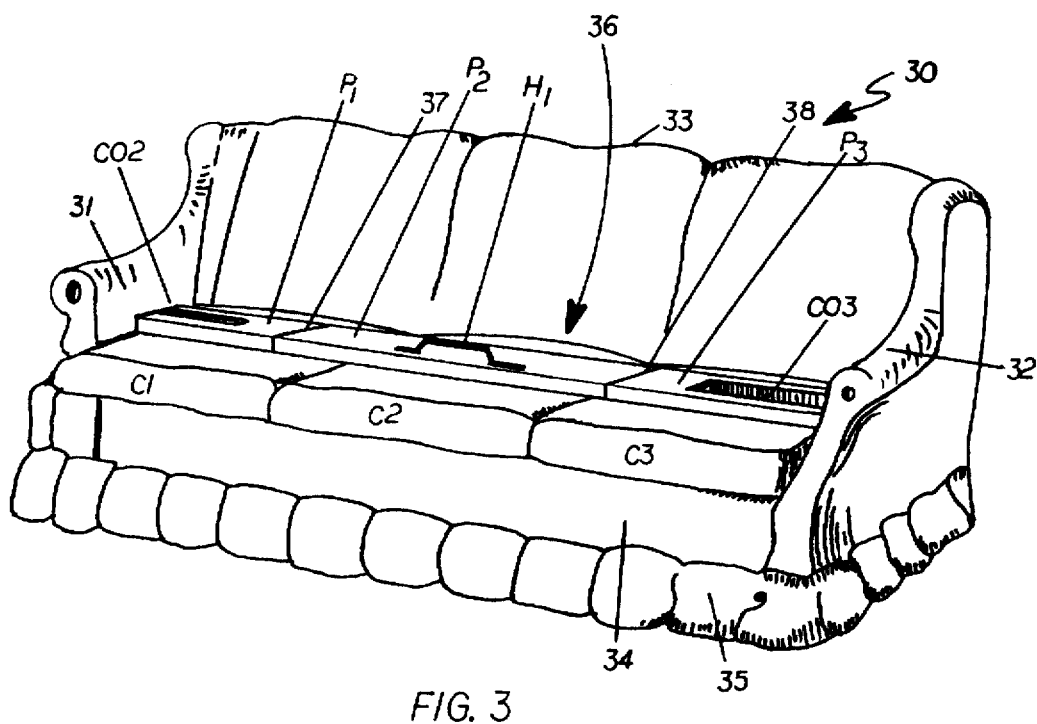
FIG. 3 shows the invention as it is applied to a straight sofa.
Figure 4:
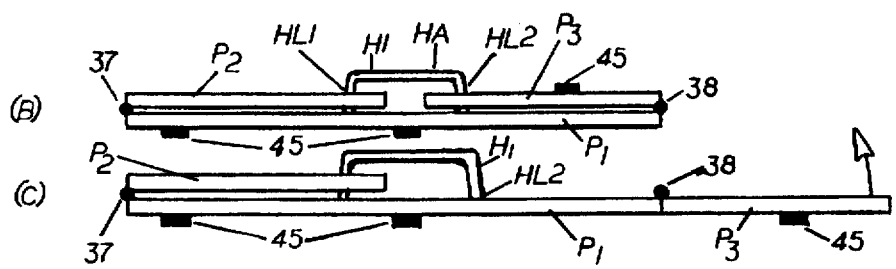
FIG. 4a is a top plan view of a modification of the invention.
FIG. 4b is a side elevational view showing the protector of FIG. 4a folded for storage.
FIG. 4c is a side elevational view of the protector of FIG. 4a, with one side folded.
Figure 4A:
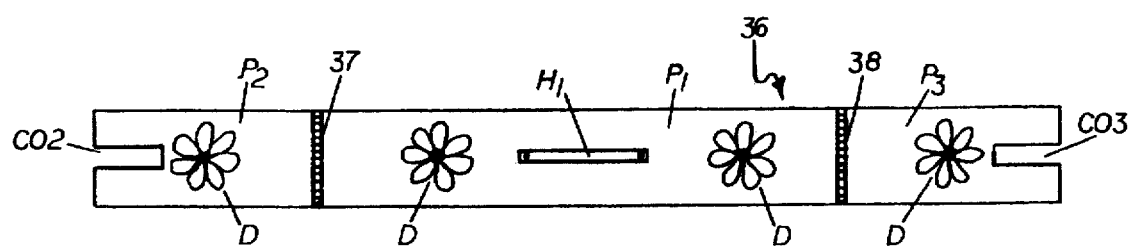

Referring now to FIGS. 1 and 2, a conventional fabric covered stuffed chair 10 having a bottom box 11, arm rests 12 and 13, seat cushion 14, back rest 15, and wings 16 and 17 is protected by protector 18. Protector 18 in this embodiment is constituted by a rigid board or panel 19 and in this embodiment, a fabric forms a decorative envelope 20. Tuck flap 21 is a flexible fabric extension extending from the rear of envelope 20 (or from the rear of board or panel 19) and is tucked in the bight between the lower edge of back rest 15 and the rear edge of seat cushion or pad 14 to retain the protector in place. Preferably the envelope is of a complementary color coordinated color to the fabric of covered chair 10 and thus adds a further design dimension to the furniture designer. As will be shown later herein, board or panel 19 can be a decorative wood such as cherry, walnut, birch, mahogany, pine etc. impregnated with a plastic (such as polyurethane) and the envelope 20 omitted. The retainer tuck flap 21 can be secured to board or panel 19 and a decorative design, such as design 22, can be in fabric sleeve 20 or formed on the upper and/or lower surface of rigid board of panel 19, as by inlaid mosaic, applique, stencil screening, etc. The fabric sleeve need not completely cover both sides of board or panel 19. The cover can be retained on the board or panel 19 by an elastic edging on the bottom side.

Referring now to FIGS. 3 and 4a, 4b and 4c, a conventional sofa 30 having, in this case, three-cushions C1, C2, C3, arm rests 31 and 32, back 33, box frame 34 and dust skirt 35, is protected by protector 36. In this embodiment protector 36 is comprised of a plurality of rigid panels $P_1$, $P_2$, $P_3$ hingedly connected together by hinges 37, 38 so that they may be folded into a compact form for storage. For example, the protector 36 in the folded form shown in FIG. 4b, can be stowed under the sofa 30 behind the dust skirt 35.

In the embodiment shown in FIGS. 3, 4a, 4b and 4c, the panel $P_1$ has a handle H1 secured thereto for easy and convenient carrying and end panels $P_2$ and $P_3$ are provided with cut-outs C02 and C03, respectively, which are aligned with handle H1 and straddle the handle when the panels are folded on hinges 37 and 38. The legs HL1 and HL2 of the handle are long enough that the arm HA of the handle is above the ends of panels $P_2$ and $P_3$ for easy gripping of the handle. The handle can be metal, cloth, leather or molded plastic. The panels are provided with decorative designs D and the panels may be a quality wood, simulated wood, plastic or metal, such as polished brass, stainless steel, aluminum, etc. The basic property is that the panels are uncomfortable for a dog to rest its body on and relation to the size of a dog, makes the seating space uncomfortable for the dog. Preferably, they need not cover the entire cushion surface and, in fact, for large dogs, the panels do not have to be wide in relation to the front-to-back length of a seat cushion.

For small dogs, the protector can be a plurality of narrow panels or rods R1, R2, and R3, as shown in FIG. 8a connected at their ends by connector members 41 and 42. Protectors of the type shown in FIG. 8a allow the seating fabric of the furniture to show through. A preferred material for the protector shown in FIG. 8a is polished brass with a protective anti-tarnish film thereon.

A plurality of such units may be scattered on the seating surface to render the seating surface uncomfortable for the pet to rest upon. The individual protector units can be retained on the seating surface by their weight, or by tuck flaps of the type shown in FIGS. 2 and 6a, or by the hook portion patch 45 of hook and loop-type fasteners, or by small depending projections from the undersurface of the protector engaging a woven fabric surface, for example.

In FIGS. 6a and 6b, hinges H1 and H2 are arranged so that panels $P_1'$, $P_2'$ and $P_3'$ fold for storage accordion-style (FIG.

6b). An outer decorative fabric sleeve 46 has tuck flaps 21' at each lateral end.

Referring to FIGS. 5a and 5b, a three-piece sectional sofa 50 having end sections 51 and 52 and an angle section 53 is protected by discrete decorative protectors 54, 55 and 56. Protectors 54, 55 and 56 all have artistic designs on at least their upper exposed surfaces and optional hook portion patches 45 on the lower surfaces. Protector panel 54 has a handle 57 secured to the upper surface and each of panels 55 and 56 have slots 58 and 59, respectively. In this way, panels 55 and 56 can be stacked for storage with handles 57 passing through slots 58 and 59 and having handle arms HA long enough to pass through the slots sufficiently so that the grip portion of the handle can be easily and comfortably grasped, and at the same time retain the panels in a neatly stacked order. Note that the lateral edges of the panels are shaped to accommodate the sectional sofa 53. While the panels 54, 55 and 56 are shaped to accommodate the sectional sofa, the panels may overlap at the ends. They may also overlap the end cushions.

In the embodiment shown in FIG. 7, a rigid board having handle 61 formed in the edge thereof and a plurality of decorative openings 62 therein. The embodiments of FIGS. 8a, 8b and 8c demonstrate that the protectors 42, 63 and 64 can have decorative shapes and have decorative inlays 65, or gird openings 66 or have paintings or other art work 67 applied, embossed or carved on the exposed surfaces thereof. As shown in FIG. 9, the upper surface of the protector panel 68 is decorated with a three-dimensional artistic design 69, which may be carved or molded and secured to surface 68.

From the foregoing, it will be apparent that the invention is a solution to the problem of protecting stuffed fine furniture from dogs and at the same time, adds a complementary design dimension or parameter to furniture designers and manufacturers. Since the protector panels are of low cost, they can enhance furniture sales. There are many situations where the consumer in need of a new sofa, for example, delays or puts off the purchase because of the presence in the home of a dog which habitually climbs on and sleeps on the sofa. The protectors of this invention make it uncomfortable to the dog and thus can be used to train the dog to stay off the sofa. The manufacturer or sales distribution organization can give the protector to induce sales. The manufacturer could provide the customer with a sleeve 46 in complementary fabric and the rigid panels can be supplied by the purchaser which could be inserted or assembled in the sleeve. The decorative effect of color coordinated fabrics could be a selling feature which would be very low in cost.

The invention is particularly effective for large dogs, which are believed to be more damaging to upholstered furniture than smaller dogs. The panels are wide enough to leave little space for the dog and an 4–8" wide board is sufficient. It is most uncomfortable for the dog to be partially on a rigid board or frame and partially on a softer sofa cushion. For smaller dogs a larger width board can be used, or a lightweight decorative frame such as shown in FIG. 8a could be used. The length of the panels are such as to span the seating space, but as noted above, where a plurality of panels are used, the ends could overlap slightly. The edges can have filigree or scallop design or be straight. The tuck flaps permit the panels to be made lighter, holding the panels in the seating positions using the resistance afforded by the tuck flap. The hinged panels are of sufficient length (when unfolded) and weight that they do not need tuck flaps (or the hook patch portions or short depending projections) to retain the protector panels in position on the seating space. The panels could be made long enough to rest on the arm rests of a sofa, but this is not necessary. The individual panels can be rigid wood, plastic or metal or combinations of these materials. The use of contrasting color coordinated fabric makes protector panels attractive and easily seen and removed prior to normal use of the furniture. However, as noted above, the fabric of the sleeve embodiments could be the same as the fabric covering the furniture and provided with the furniture with instructions on the types of panels to fill the sleeves.

While there has been shown and described a number of preferred embodiments of the invention, it will be appreciated that various adaptations and modifications can be made without departing from the spirit and scope of the invention.

What is claimed is:

1. A furniture protector device for protecting the fabric on sofas and stuffed chair furniture having a seating space from damage by dogs, comprising, in combination with said seating space:

one or more rigid panel members having a width to span a predetermined portion, but not all, of the front to back portion of said seating space and a length to span approximately the width of said seating space, and a decorative means on said one or more rigid panel members.

2. The furniture protector device defined in claim 1 including handle means secured to said one or more rigid panel members.

3. The furniture protector device defined in claim 1 wherein there are a plurality of said panel members and means hingedly connecting said plurality of panel members for folding to a compact assembly.

4. The furniture protector defined in claim 3 wherein one of said panel members has said handle secured thereto and the other of said panel members have openings through which said handle means passes.

5. The furniture protector defined in claim 1 including means for retaining said protector on said seating space.

6. The furniture protector defined in claim 5 wherein said means for retaining is the weight of said one or more panel members.

7. The furniture protector defined in claim 5 wherein said furniture has a seat cushion engaging the lower end of a back cushion to form a bight, said means for retaining is constituted by one or more tuck flaps secured to and extending from edges of said panels for tucking into said bight.

8. The furniture protector defined in claim 5 wherein said means for retaining is constituted by hook patch on the bottom surface of said one or more panel members.

9. The furniture protector defined in claim 1 wherein said fabric on said sofa has predetermined color and design and said furniture protector device includes a fabric sleeve covering said one or more panels.

10. The furniture protector defined in claim 9 wherein said fabric sleeve is contrastingly color coordinated with said fabric on said sofa.

11. The furniture protector defined in claim 1 wherein there are a plurality of said panels, means hingedly connecting said panels together and wherein said panels are made of wood.

12. The furniture protector defined in claim 1 wherein each said one or more panel members is comprised of a frame having openings therein and said decorative means is comprised of pattern of said openings in said frame.

13. The furniture protector defined in claim 1 wherein said decorative means is a three-dimensional object secured to an upper surface of said rigid panel.

14. The furniture protector defined in claim 1 wherein said decorative means is constituted by the shape of the edges of said one or more panel members.

15. A device for protecting upholstered furniture from a pet dog comprising, in combination with said upholstered furniture a fabric sleeve for receiving one or more rigid panel inserts, said fabric sleeve having a length to cover the length of said furniture and a depth sufficient to preclude comfortable seating by said pet dog and having a color and fabric which is a color coordinated contrast to said upholstered furniture.

16. A method of protecting upholstered furniture having a seating area from a pet dog, comprising:

providing one or more rigid panel members and forming a decorative surface on said one or more rigid panel members, which decorative surface is coordinated to be complementary in color and design to said upholstered furniture, said one or more rigid panel members having length and depth dimensions receivable on said seating area, and positioning said one or more rigid panel members with their decorative surfaces on said seating area to make it uncomfortable for said pet dog.

17. A furniture protector system for a multiple seat stuffed sofa comprising:

a plurality of rigid panel members, there being at least one rigid panel member for each seat of said multiple seat stuffed sofa, decorative means on each said rigid panel member, and each said rigid panel member having a surface area sufficient to cover a predetermined area of a selected one of a seat of said multiple seat stuffed sofa, said rigid panel member shaving structural configurations so that they can be stacked, one on another, when not in use as a furniture protector, and wherein one of said rigid panels has a carrying handle secured thereto, and the remaining of said rigid panels are shaped to accommodate said handle when said panels are stacked when not in use.

* * * * *